UNITED STATES PATENT OFFICE.

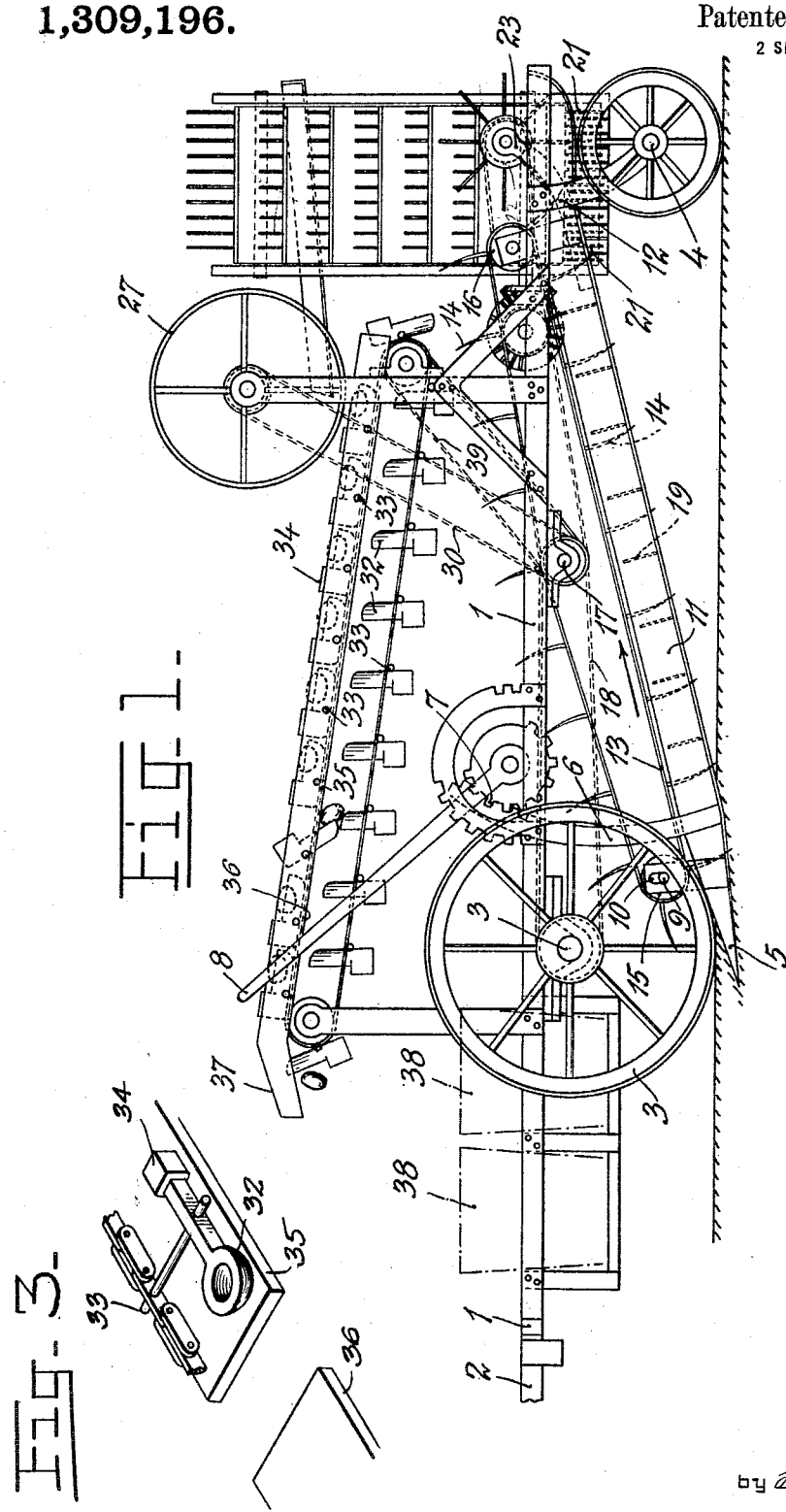

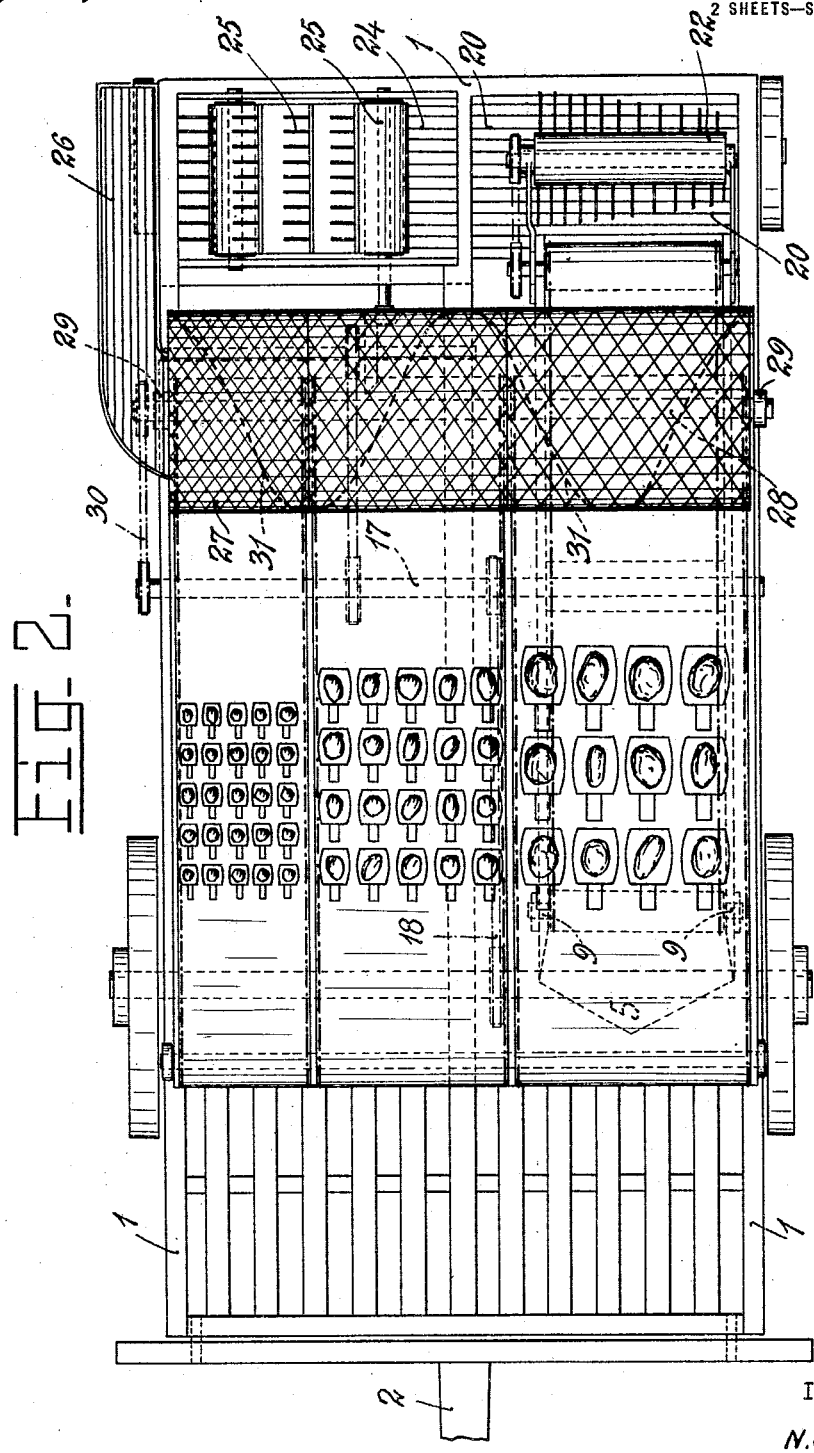

NILS OLAF HAUG, OF DRAMMEN, NORWAY.

MACHINE FOR TAKING UP POTATOES, &c.

1,309,196.  Specification of Letters Patent.  Patented July 8, 1919.

Application filed March 8, 1919. Serial No. 281,477.

*To all whom it may concern:*

Be it known that I, NILS OLAF HAUG, agriculturist, citizen of Norway, residing at Drammen, Norway, have invented new and useful Improvements in Machines for Taking Up Potatoes, &c., of which the following is a specification.

The present invention relates to a machine for taking up potatoes, etc., and is mainly characterized in this, that one or more arrangements for sorting by size, which divides a mixture of potatoes, stones, etc., into several groups, each group containing only those of approximately the same size, said size-sorting-arrangements being combined with one or more weight-sorting-arrangements, which divides said groups into new groups containing those the weight of which is over or under certain values, thus separating articles of different weights in the mixture taken up from the field, also separating potatoes and stones.

The invention is illustrated in the accompanying drawing, in which:

Figure 1 shows the machine in side elevation.

Fig. 2 shows the same in plan.

Fig. 3 is a fragmentary perspective detail view.

The frame —1— of the machine is formed at the front end with a draw-rod —2— and is supported on wheels mounted on shafts —3, 4—. The machine can thus easily be drawn over the field. —5— is a shovel intended when the machine is working to cut out and take up the strip of earth, in which the potatoes are embedded. By means of the rack —6—, the gear —7— and the lever —8—, which suitably is arranged at the seat of the driver, the depth of the strip of earth to be taken up by the shovel may be regulated. In order to permit the shovel —5— to slide over bigger stones etc. without attending to the lever —8—, the foremost part of the shovel is hinged on bolts —9— resting in bearings —10—, which allow to a small extent a shifting of the foremost part of the shovel. At the rear end the shovel leads to the conveyer —11— which is secured by means of the arms —12— to the shaft —4— in such manner, that the shovel and the conveyer will swing about the shaft —4— as soon as the outer part of the shovel is raised. In the conveyer —11— the strip of earth which has been cut out will be elevated by means of the traveling-chain —13—, which is provided with clutches or pins —14—, suitably arranged flexibly. The traveling-chain —13— is governed by the rolls —15— and —16— and is driven from a sprocket on the shaft —17—, which by means of the chain —18— and the necessary sprockets is driven from the shaft —3—.

The bottom of the conveyer —11— is provided with openings, holes or slots, which will allow articles under a certain size to fall back into the field. The greater part of the earth of the strip taken up will in this way be separated in the conveyer and the mixture deposited at the upper end will mainly consist of bigger articles such as potatoes, stones and hard clods of earth, potato-grass etc. To hasten the crumbling the pins —19— may be mounted in the conveyer. These pins suitably should be flexible.

The chain —13— will deposit the mixture in the drum —20—, suitably arranged as a netting through the meshes of which the heavy and proportionally small articles such as potatoes, stones, etc., will fall into the compartment —21—, the potato grass remaining on the upper side until it is swept away by a brush roller —22—. This device is placed in the arms —23— in the conveyer —11— and is provided with brushes suitably made of steel springs. From the compartment —21— the mixture—now consisting of potatoes, stones and clods of earth—will be carried into the compartment 24 in which it is caught by the lifting device 25, which is driven by chain from the shaft 17, and carried up into the feeding conduit 26 of the size-sorting or volume-sorting-arrangement. This lifting device preferably consists of an endless apron having a series of uniformly spaced transversely arranged rows of teeth thereon which act to engage and retain the mixture of potatoes, stones and clods, as it is elevated and finally deposits said mixture in the conduit 26. The volume-sorting-arrangement 27 is a drum furnished with holes, the sizes of which from the feeding arrangement increase gradually in consecutive compartments. The shaft 28 of the drum is mounted in bearings 29 and is driven from the shaft 17 by means of the chain 30. During the working of the machine the mixture is forced through the drum by means of the screw-device 31. From the volume-sorting arrangements the compound glides over into the weight-sorting arrangements which consist in cup-elevators or cup-conveying systems, of which there is arranged one set for each compartment of the drum 27. In Fig. 2 only a part of the cups are shown. The cups 32 of these conveying systems are rotatably arranged on pivots 33 and are constructed in such manner, that each cup only will take one article (potato, stone, clod of earth). The volume-sorting-arrangement 27 is constructed in such manner and travels at such a speed that it only will deliver one article to each cup which passes.

On the upper part of the cup-feeding system, the cups travel along a supporting track and cannot swing about their pivots (shafts).

At a certain place—between the points 35 and 36—the supporting track is interrupted and the cup will here swing around and drop its contents if the article exerts a greater turning moment on the pivot or shaft 33 than the counter-weight 34. Otherwise the suspension of the cups is thus constructed, that they cannot swing in the opposite direction. Therefore all articles whose weight does not exceed a certain amount—dependent on the construction of the cup—will be carried forward to the spout from which they will slide down into baskets 38 on the frame 1.

The cup-conveying-system is driven from the shaft 17 by means of a chain 39.

It will be easily understood, that the potatoes can be separated from stones and earth by means of the above described machine since the proportion between the specific weight of potatoes and the specific weight of stone is approximately as 1 is to 2.7.

If the cups of the cup-conveying-system are for instance arranged in such a way that they will eject all articles through the passage for ejection of stones whose weights are 1.5 the specific weight of the potatoes, not only all potatoes, but also practically only potatoes will be collected in the baskets 38.

By employing narrow baskets adjacent each other under the potato-spouts the potatoes taken up by the machine will be automatically sorted according to size in as many groups as the drum 27 contains different compartments.

Having now particularly described and ascertained the nature of my said invention and in what manner the same is to be performed, I declare that what I claim is:—

1. In a machine of the character described, in combination, sizing means including a cylinder of wire mesh, the openings formed by the wire mesh successively increasing in size from the feeding to the opposite end of the cylinder, and means operating in the cylinder for advancing the material therethrough and combined sorting and conveying means, one for each size of screen mesh associated with the cylinder and designed to automatically dump parts of the mixture being conveyed when the parts possess an excessive specific weight.

2. In a machine of the character described, sizing means, and combined sorting and conveying means associated with the sizing means consisting of a series of endless chains, connecting rods having their ends journaled in the adjacent chains, a plurality of weighted cups arranged in various sized groups and connected in transverse series to the rods and normally held immovable on the chains but designed to automatically dump at certain points in the upper lays of the chains and when the objects being conveyed possess an excessive specific weight.

3. In a machine of the character described, sizing means, and combined sorting and conveying means associated with the sizing means and consisting of a series of endless chains; a plurality of pivoted and weighted cups arranged in various sized groups on the chains and spaced supporting track sections arranged beneath the upper lays of the chains for normally holding the cups immovable but permitting of the automatic dumping of the cups when the objects being carried overbalance the cups at the time the cups pass over the space between the track sections.

4. In a machine of the character described, in combination, sizing means including a drum having a plurality of groups of various sized openings, the openings successively increasing in size from the feeding to the opposite end of the drum, means for advancing the mixture through the cylinder, and sorting means arranged beneath the drum for coacting with the different sized openings in the drum.

5. In a machine of the character described, sizing means including a drum having a plurality of various sized openings arranged in groups, the openings successively increasing in size from the feeding to the opposite end of the drum, a rotatably mounted screw in the drum for advancing the material from the feeding to the opposite end of the drum and for causing the mixture to pass through the proper openings, and groups of sorting means arranged beneath the drum for receiving the mixture as it leaves the drum.

6. In a machine of the character described, in combination, a supporting frame, receiving means in the frame, vine separating means in the receiving means, sizing means on the frame, means for elevating the mixture from the receiver, feeding means for receiving the mixture from the elevating means and for delivering the mixture to the sizing means, and groups of coacting sorting and conveying means mounted in the frame beneath the sizing means.

In testimony whereof I have signed my name to this specification.

NILS OLAF HAUG.

Copies of this patent may be obtained for five cents each, by addressing the "Commissioner of Patents, Washington, D. C."